US006990197B2

(12) United States Patent
Wong et al.

(10) Patent No.: US 6,990,197 B2
(45) Date of Patent: Jan. 24, 2006

(54) HANDS-FREE SPEAKER TELEPHONE

(75) Inventors: John Patrick Wong, Vancouver (CA); Ben Stafford, Hampshire (GB); Brian Griffiths, Slough (GB)

(73) Assignee: Nokia Corporation, Espoo (FI)

( * ) Notice: Subject to any disclaimer, the term of this patent is extended or adjusted under 35 U.S.C. 154(b) by 438 days.

(21) Appl. No.: 10/039,948

(22) Filed: Nov. 8, 2001

(65) Prior Publication Data

US 2003/0086562 A1    May 8, 2003

(51) Int. Cl.
*H04M 1/00*    (2006.01)

(52) U.S. Cl. .......................... 379/433.02; 379/433.01; 379/433.03

(58) Field of Classification Search ........... 379/433.02, 379/420.02, 433.01, 433.03; 455/90.3, 575.1; 381/386

See application file for complete search history.

(56) References Cited

U.S. PATENT DOCUMENTS 5,790,679 A * 8/1998 Hawker et al. ............. 381/386
6,148,080 A * 11/2000 Collin .................... 379/433.02
6,658,110 B1 * 12/2003 Andersen ............... 379/433.02

* cited by examiner

*Primary Examiner*—Jack Chiang
(74) *Attorney, Agent, or Firm*—Alston & Bird LLP

(57) ABSTRACT

An improved hands-free speaker telephone designed to provide high-quality sound in a relatively small instrument, while at the same time avoiding acoustic shock to a user pressing the device too closely to an ear. If a speakerphone is mistaken for an ordinary portable or cellular phone, or simply out of misguided habit, a user may intentionally or inadvertently press the speaker against an ear. This action may subject the ear to an overly-loud audio event if the speaker begins producing sound, as hands-free speakerphone speakers are typically set to a much higher volume than those of ordinary phones. The effect, which is sometimes referred to as 'acoustic shock', is worsened significantly where the user actually succeeds in sealing the phone around the ear, as commonly (and harmlessly) occurs with standard (personal) phones. To avoid this undesirable phenomenon, the hands-free speakerphone is provided with a seal-proof speaker configuration. The seal-proof design includes various anti-sealing features that may be used individually or in combination. The anti-sealing features of the present invention include a housing for the hands-free speakerphone comprising two main parts that fit together to enclose the actual speaker element. The two housing parts are joined in such a way as to crate a parting line, or recess running along the exterior of the assembled speakerphone. Sound ports that permit the sound generated by the speaker element are located along the parting line, which prevents the user's ear from forming an air-locked cavity containing them. The speaker ports may also be located on a surface of the speakerphone that is curved to the extent that forming such a seal would be difficult or impossible. The ports themselves may be hidden so that the user does not attempt to hold them to an ear at all. Finally, the sound ports are preferable spaced apart such that even if the user does so, fewer than all of the speaker ports would be included in the area the user is attempting to seal to an ear.

8 Claims, 6 Drawing Sheets

HANDS-FREE SPEAKER TELEPHONE

The present invention relates generally to the field of instruments for utilizing telephone networks, and specifically to a hands-free speaker telephone for annunciating a received telephone communication.

BACKGROUND OF THE INVENTION

Telephones at their inception were relatively large and often unwieldy devices, and necessarily so. Incorporated into a telephone was both a microphone and a speaker, each situated so that it could be employed by a user attempting to engage in conversation, as well as the electrical circuitry needed to drive them. All of these components were almost primitive by modem standards. Typically, the microphone was incorporated into a single component that served as a base and housed most of the circuitry. A speaker attached to the base by a cord could be held up to the user's ear. In other models, the microphone and speaker were incorporated into a single handset, which was attached to the base housing by a cord (this, of course, remains a popular design). The handset disposes a microphone approximately six inches from the speaker so that it is proximate the user's mouth when the speaker is held to the user's ear. The user can therefore turn in any direction and still retain both speaker and microphone in a usable orientation. This manner of speaking on the phone is standard and almost universally recognizable. Nearly anyone in the modem world would, therefore, understand how to use a handset for telephone communication, even if they had never seen a particular telephone instrument. This is generally true notwithstanding the great variation in the cosmetic design of the instrument. For example, a telephone handset may take on the appearance of an automobile or a shoe, in addition to simply being a conventional design. The user would nevertheless determine in short order how to hold the speaker of the device to their ear and speak into the microphone While a convenient improvement over prior systems, however, the handset nevertheless had the disadvantage of requiring the user to hold it to an ear with a hand or by awkwardly holding it between head and shoulder. Further improvements in microphone and speaker technology have addressed this disadvantage by allowing for the more widespread use of "hands-free" or "speaker" phones. With such instruments, once the call is established, the user does not have to hold or manipulate the phone at all, but simply talks in the direction of the microphone. Improvements in microphone technology will allow the user to be understood by the called party even if speaking at a distance of several feet from the unit itself. By the same token, the speaker is loud enough to be heard at that distance. Obviously, several people may participate in the call without the need to pass a handset back and forth or use a second instrument connected to the same line. A conventional handset is still desirable in certain situations, of course, such as those that require a certain amount of privacy.

While at times this need is still felt, however, phone conversations involving more than one user on each end of the line are becoming increasingly common, especially, but not exclusively, in business settings. At the same time, there is an increased awareness that in certain settings, such as using a mobile or portable phone while driving, watching children, and other activities requiring visual attention, it is safer to use a speakerphone to avoid the relatively reduced mobility arising from having to maintain a telephone handset in a certain position. Even where safety considerations are not of concern, at times users will simply prefer to speak on the telephone while maintaining both hands-free for other tasks. Given all of its advantages, coupled with the advances in technology providing ever-greater sound quality, the hands-free speakerphone is likely to become more and more popular.

A hands-free phone's speaker, which is remote from the user's ear, must be louder, of course, than one on a conventional handset that is held next to the ear. Otherwise, it will not be heard. The volume may be adjustable, but will often be adjusted loud enough to be heard by several parties somewhat separated from the instrument itself. This increased volume does present somewhat of a hazard if accidentally held too close to a user's ear. Such an accident may occur if a user unfamiliar with a specific hands-free phone mistakenly believes it to be a conventional handset or simply picks up the device and holds it to an ear reflexively. Whatever the reason, the user may then experience a sudden loud noise, generated not by a conventional handset speaker, but by the much louder hands-free speakerphone speaker. The effect of such a sudden loud noise emanating from a telecommunications device is sometimes referred to as acoustic shock, and can result in temporary or even permanent hearing damage. Even if not a cause of hearing damage or related injury, however, such a sudden, loud noise so close to the ear is both irritating and uncomfortable. It is an experience most users would wish to avoid.

The risk that a user will too closely position a large speakerphone is not high. Especially when the instrument itself is obviously not intended for handheld use. In other circumstances, however, the risk is greater. The telephone, like other electronic devices, has through improved miniaturization techniques and other advances in technology became increasingly smaller. A speakerphone with a satisfactory microphone and speaker can now be quite compact, approaching the size of a cellular phone. This small size is desirable, of course, because they are more portable, less obtrusive, and easier to mount in an automobile or other such location. The compact nature of these instruments, however, may mislead some users to assume that they are small portable or celluar phones and press the speaker against an ear. This is not an unexpected phenomenon, especially when considered in light of the wide variation in modem telephone design, producing shapes that are not limited to a few widely recognizable models. Needed, therefore, is a way to avoid acoustic shock from confused users placing high volume phones to their ear, while at the same time retaining the design flexibility to offer small and aesthetically pleasing styles.

SUMMARY

In order to address the deficiencies and shortcomings in the prior art, as described above, the present invention provides an improved hands-free speakerphone, the design of which is intended to prevent, lessen the risk of, and alleviate any injury from, acoustic shock.

In one aspect, the hands-free speakerphone of the present invention includes a housing for retaining the speaker in a substantially fixed interior position relative to the housing, at least one speaker part formed in the housing for allowing the audio produced by the speaker to be clearly heard without the housing, and an anti-sealing feature incorporated into the housing.

DETAILED DESCRIPTION

Figure 1:
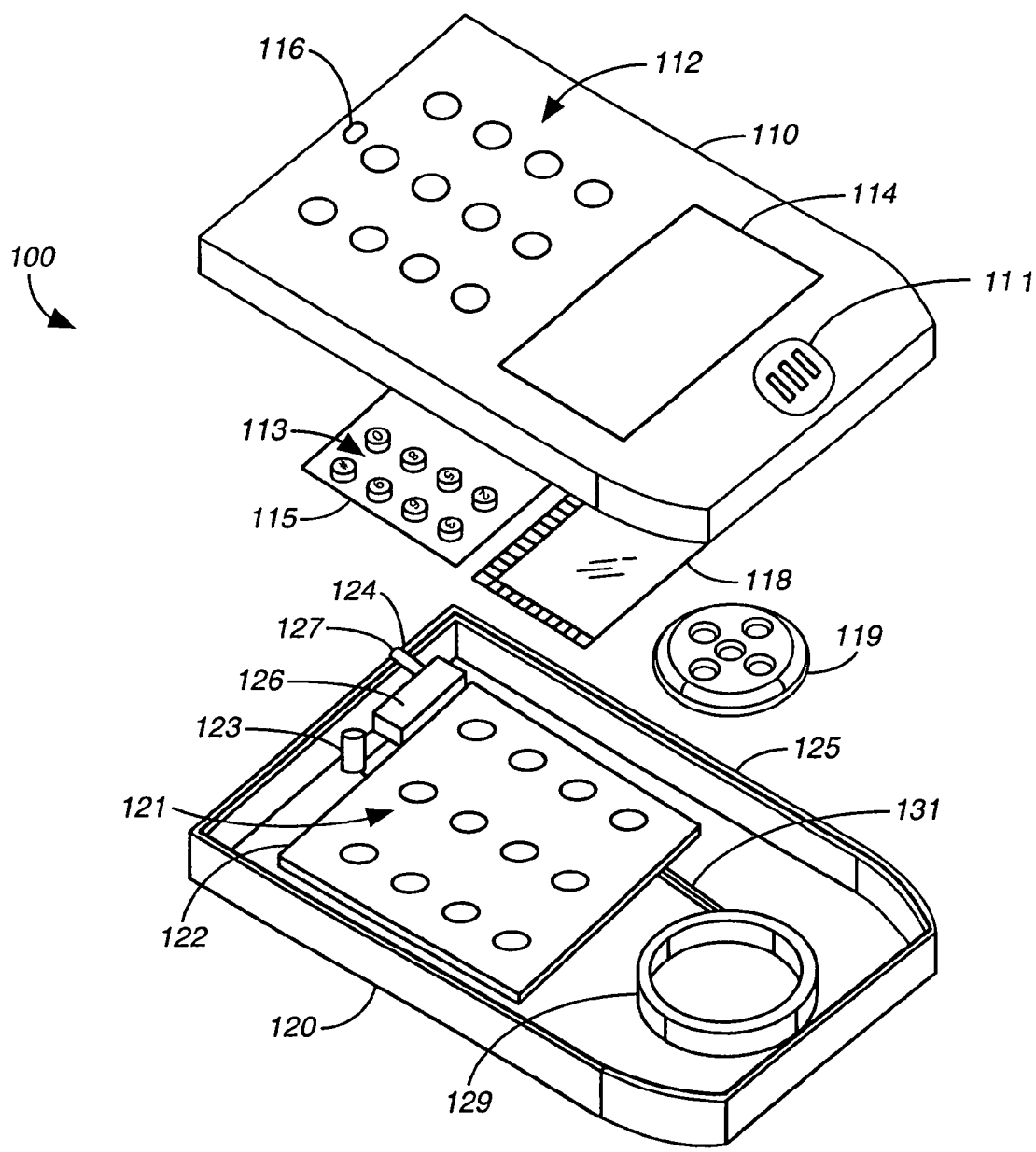
FIG. 1 (prior art) is a perspective view (exploded) of a conventional wireless phone of the prior art.

FIG. 1 is a perspective view (exploded) of a conventional hands-free telephone 100 of the prior art. Telephone 100 includes front housing member 110 and back housing member 120, which fit together to enclose all internal components of telephone 100. Front housing 110 is provided with a plurality of openings 112 to receive the keys 113 of keypad 115. Keypad 115 may be composed of separated keys or, as shown in FIG. 1, a single pad having a plurality of raised keys. The keys 113 correspond to pressure sensitive contact switches 121 on printed circuit board (PCB) 122. Front housing 110 also features a window 114 through which liquid-crystal display (LCD) 118 is visible when the phone is assembled. LCD 118 provides the user with a visual interface that may show the number being called, the identity of a caller, the presence of a voicemail message, battery-level, signal strength, and the like. The audio interface is provided by speaker element 119, which converts received and processed communications signals into an audio presentation that the user may listen to. Although disposed between front housing 110 and back housing 120 of telephone 100, speaker element 119 is typically heard by the user through speaker ports 111 provided in front housing 110.

The conventional telephone 100 of FIG. 1 is designed with the intention that the user will, in order to listen to a conversation, press the front housing 110 against an ear such that speaker ports 111 are directed toward the opening of the ear and the outer fleshy portion of the ear circumferentially contacts the housing area surrounding speaker ports 111 to create a seal. A seal, in this context, simply means that the soft outer ear is able to make contact with the phone in a way that air does not pass into the closed space created by the ear and the phone once contact is made and until forceably broken. In some cases, a small quantity of air is even forced out past the ear as the phone is pressed against the ear, but not permitted by the ear-phone contact to re-enter, even with minor phone movement occurring. A slight pressure differential is thereby created, strengthening the seal. The effect of this sealing phenomenon is to permit the user to better hear the conversation by, at least to some extent, containing sound from the speaker and preventing the entry of unwanted ambient noise. Admittedly, the aforementioned seal effect and the pressure differential are quite small, as is the force required to break contact, but the effect nevertheless enhances the user's ability to hear the conversation. Although the speaker volume of telephone 100 is preferably adjustable, its upper limit is set so that acoustic shock will not occur even when the phone is used in the manner described above.

Back housing 120 simply retains the internal telephone components in the configuration alluded to above already shown in place in FIG. 1. PCB 122 includes the major components of telephone 100. Power supply 126 may be used to convert electrical power from an outside source (not shown) to levels usable by the various components. Power may also be supplied from a battery power source (not shown) and likewise converted as necessary. Power supply 126 includes an adapter port 127 for plugging in an external power source. Adapter port 127 is accessible externally because it protrudes through notch 124 formed in rim 125 of back housing 120. Also shown already in place in telephone 100 is microphone 123 for picking up the vocalizations of the user engaged in a telephone conversation and converting them into electrical signals for processing and transmission. Microphone port 116 in front housing 110 permit the sound of the user's voice to reach microphone 123.

Speaker reservoir 129 holds speaker element 119 in place beneath speaker ports 111 when the telephone 100 is assembled, while permitting the necessary electrical connections 131 to be made. Although not shown in FIG. 1, the other components housed between front housing 110 and back housing 120 are secured in place, as necessary, in an analogous fashion. Note that only selected components are illustrated in FIG. 1, other components may be present as well.

Figure 2:
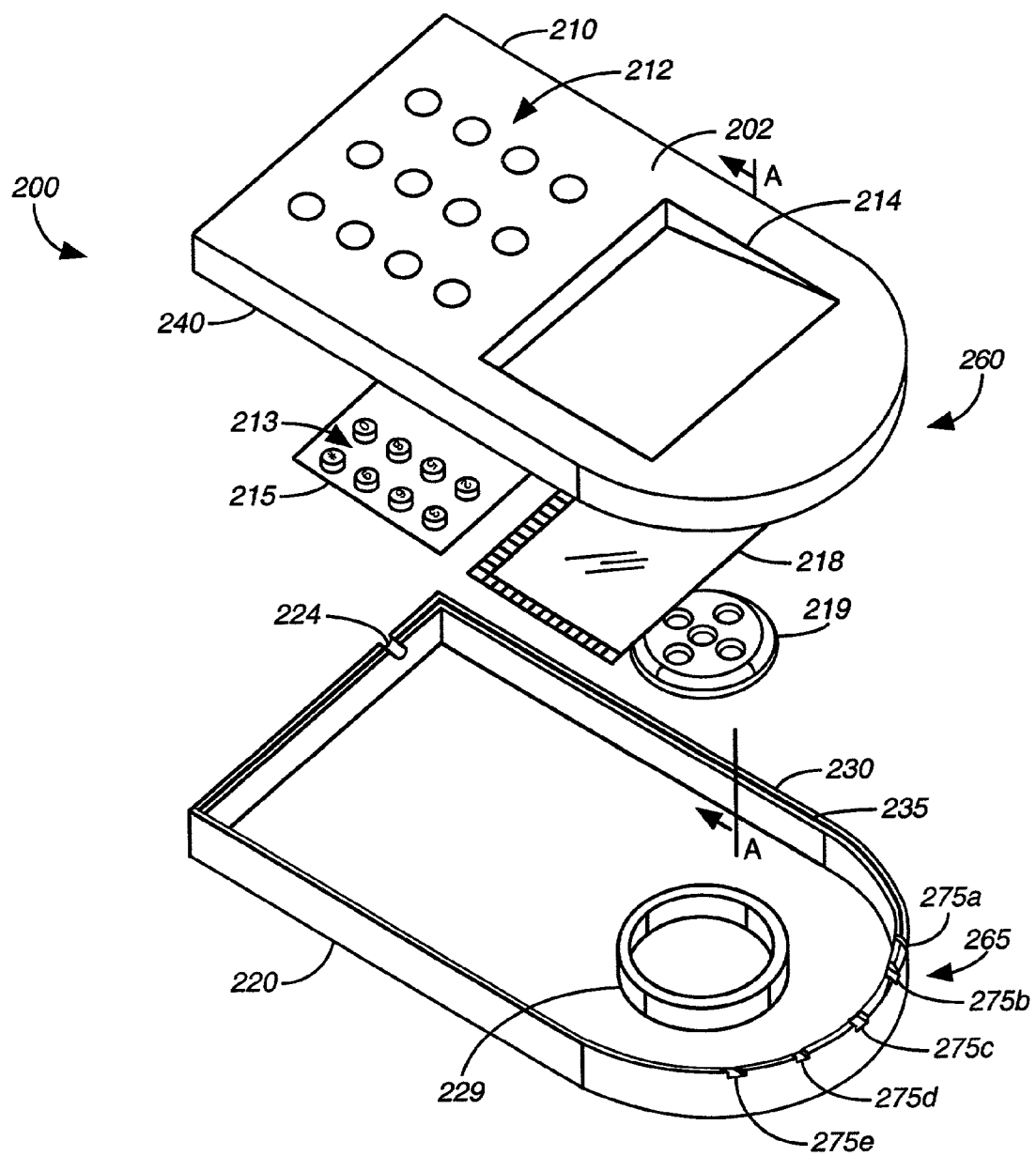
FIG. 2 is a perspective view (exploded) of a hands-free speakerphone according to an embodiment of the present invention.

FIG. 2 is a perspective view (exploded) of a hands-free speakerphone 200 according to an embodiment of the present invention. Note that hands-free speakerphone 200 contains many of the same components as telephone 100 of FIG. 1, and analogous parts will be numbered correspondingly where applicable. Back housing 220 includes speaker reservoir 229, which receives speaker element 219 when speakerphone 200 is assembled. As will be further described below, it is preferred that speaker element 219, which produces the audio output of hands-free speakerphone 200 be held substantially fixed in a definite orientation with respect to back housing 220. Speakerphone 200 will typically include a PCB having a plurality of contacts corresponding to the keys 213 of keypad 215, a battery or external power source, an external power source port, and a microphone, similar to telephone 100 (shown in FIG. 1), although these components are not shown in FIG. 2 for clarity.

Alternately, however, speakerphone 200 includes only selected ones of these components, for example an external microphone may be provided (or not included at all), and there may be no keys or LCD. The greatest advantage of the invention, however, will obtain in devices that are substantially so equipped specifically because they resemble a standard personal phone. ("Personal" being used here in the sense on a telephone that is in use held to the ear of a single user.) For illustration, note that speakerphone 200 of FIG. 2, at first glance, somewhat resembles the telephone 100 of FIG. 1. While drawn as such for purposes of illustration, in reality the wide variation currently found in telephone design increases the likelihood that speakerphone 200 would be mistaken for a telephone even where such identity of appearance does not occur.

In other words, there are so many different designs in use today for wireline telephones, speakerphones, mobile phones, media phones, and personal digital assistants (PDAs) with calling capability that the various instruments used for different purposes retain any distinctive appearance related to that purpose. A popular design may be copied for different types of telephone instruments. Speakerphones certainly do not require the bulky size of such instruments of years past. As a result, the risk has increased that a user unfamiliar with a given device, or perhaps one acting absent-mindedly, will pick up a hands-free speakerphone and position it against an ear as if it were simply an ordinary telephone.

As mentioned above, however, speakerphone 200 must provide sound at a much greater volume in order to be practicably useful. Speakerphone 200 is meant to be heard and understood at a distance of perhaps several meters. The user who mistakes speakerphone 200 for a hand-held telephone may result in permanent injury, almost certainly will cause irritation, and in some cases, puts the manufacturer of the speakerphone at risk of liability for damages. The features of the present invention, however, contribute to an acoustically safe speakerphone design notwithstanding its similarity in appearance to a telephone, thereby preserving the freedom to make instruments that are aesthetically pleasing, and that will not result in harm to unsuspecting users.

In a preferred embodiment described below, a plurality of such acoustical safety features will be presented. These can be collectively described as "anti-sealing features", a term that will be used herein with the following further explanation. Although these features are incorporated into the preferred embodiment, there is no requirement that they almost be used together, or in exactly the form in which they are shown. In other words, this illustration is exemplary and not limiting. The anti-sealing features of the present invention are intended to frustrate any attempt by the user, either inadvertent or intentional, to create a seal between an ear and the hands-free speakerphone, thereby exacerbating any acoustic shock that may occur. And any of these features may not in all cases be completely effective, but such is not a requirement of the invention.

Returning to the embodiment of FIG. 2, front housing 210 is provided with a plurality of openings 212 to receive the keys 213 of keypad 215 when the hands-free speakerphone is assembled. Front cover also forms window 214 for receiving LCD 218 in similar fashion. As with a standard telephone, the keys 213 and display 218 are readily accessible on the face 202 of speakerphone 200 for easy access. Unlike a hand-held telephone, however, the familiar tightly-clustered speaker ports (see FIG. 1) are not visible, and not in fact present on the face 202 of speakerphone 200. The absence of these speaker ports tends to assuage any natural tendency a user may have to actually raise the speakerphone 200 to an ear. This anti-sealing feature may in itself be sufficient in some instances to prevent acoustic shock, but it is preferably used in conjunction with the other features described below.

Figure 5C:
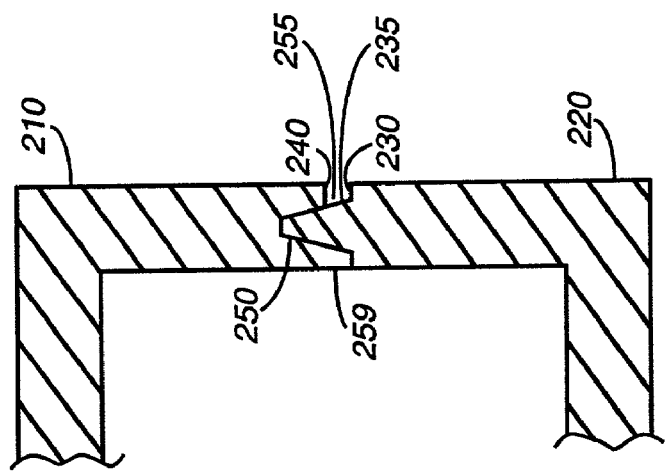
FIG. 5c is a cross-sectional view of the front and back housings in an assembled condition according to an alternative embodiment of the present invention.
Figure 5B:
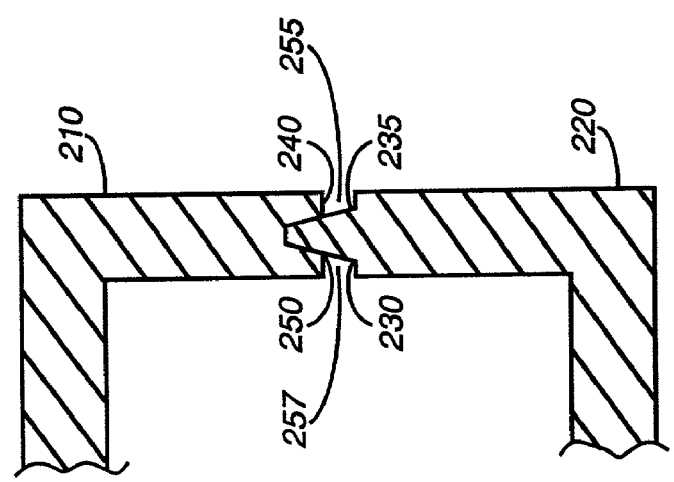
FIG. 5b is a cross-sectional view of the components of FIG. 5a fitted up into an assembled configuration.
Figure 5A:
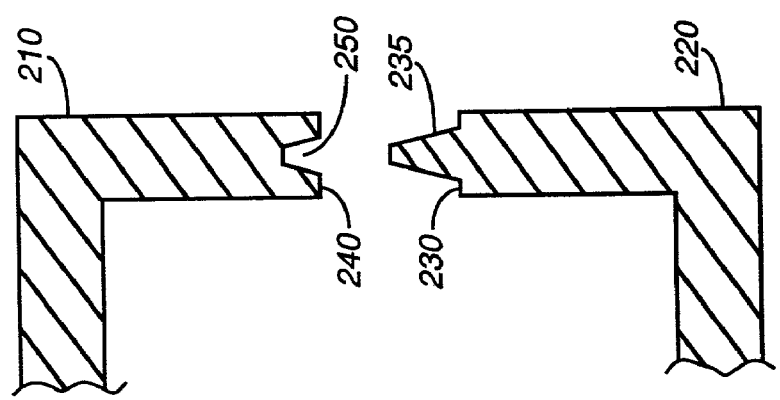
FIG. 5a is a cross-sectional view of the front and back housings formed in accordance with an embodiment of the present invention, taken along section line A—A of FIG. 2.

To be heard effectively, of course, the speaker ports must be placed such that sound is permitted to escape efficiently from the assembled telephone 200. The speaker ports now absent from face 202 must therefore be relocated. In the illustrated preferred embodiment, this is accomplished by the way in which front housing 210 and back housing 220 are formed and joined together. Back housing 220 is shaped correspondingly with front housing 210 such that the front housing 210 and back housing 220 fit together to securely enclose the internal components of speakerphone 200. Preferably, raised portion 235 of rim 230 of back housing 220 mates with a corresponding recessed portion (not shown) of front housing 210. In this way, the two housings are brought together in proper alignment and remain in proper juxtaposition relative to one another. This relationship is shown more closely in FIG. 5A, which is a sectional view of the housings of FIG. 2, taken along sectional line A—A. (Note that for clarity, the two housings appear in much closer proximity in FIG. 5A than in FIG. 2.) Referring to FIG. 5A, recess 250 is formed in rim 240 of front housing 210. Recess 250 maybe formed along the entirety of rim 240 or only a portion thereof. Raised portion 235 on back housing 220 preferably extends correspondingly along rim 230. A discontinuity may occur, for example at notch 224 formed to provide external access to internal components (for example, through adapter port 127 shown in FIG. 1). FIG. 5B shows the components of FIG. 5A in an assembled configuration. Note that raised portion 235 of rim 230 communicates with recess 250 of rim 240, but that raised portion 255 is of sufficient dimension that rim 230 does not otherwise contact rim 240. This relationship creates a recess 255 that extends along the juncture of front housing 210 and back housing 220. For convenience, this recess 255 will be referred to as a "parting line". Parting line 255 may extend all of the way around the hands-free speakerphone 200 or only for a portion thereof, but preferably extends along the speaker's port-bearing portion, as described below. In addition, while in FIG. 5B a recess 257 is also formed at the juncture of front housing 210 and back housing 220, it is not generally an advantageous feature of the present invention, and may be omitted. For example, in FIG. 5C, parting line 255 is formed when raised portion 235 communicates with recess 250, but an extended portion 259, which forms a portion of recess 250 on rim 240, actually comes into physical contact with rim 230 when the speakerphone 200 is assembled. This alternate configuration may be desirable, for example, to provide greater strength or stability to the finished product.

Figure 3:
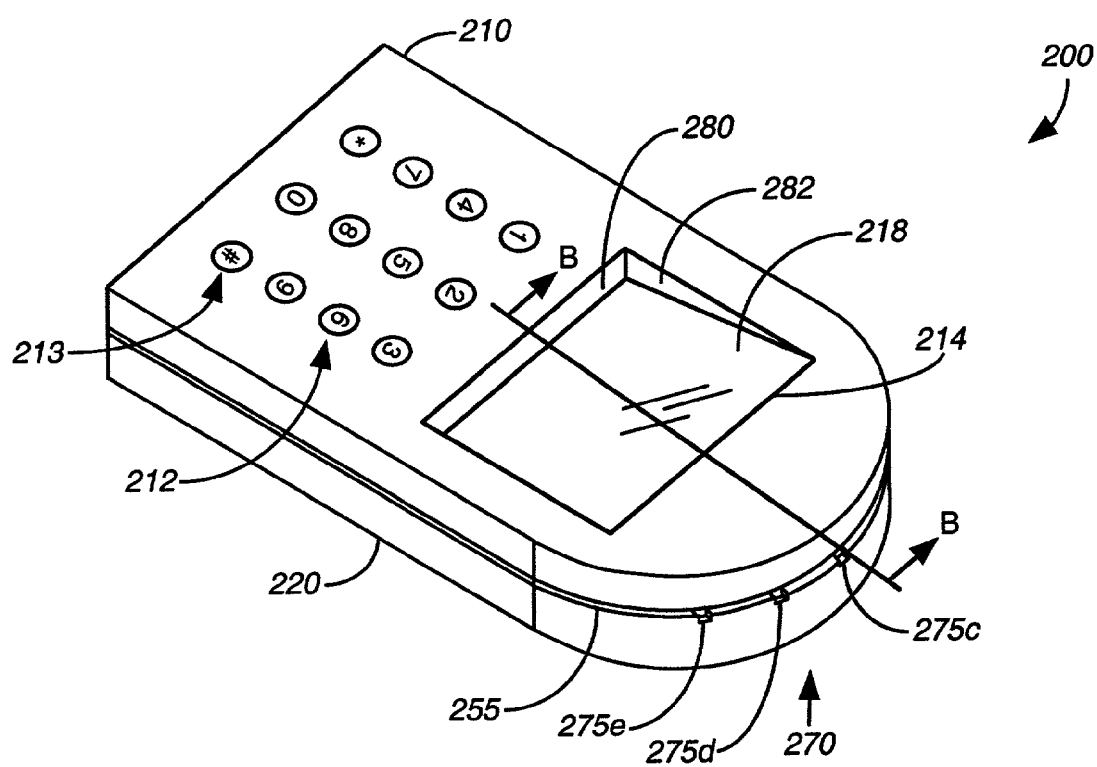
FIG. 3 is a perspective view of an assembled hands-free speakerphone according to an embodiment of the present invention.

Returning to FIG. 2, front housing 210 and back housing 220 feature curved portions 260 and 265, respectively, that when assembled form a curved edge 270 (shown in FIG. 3). Formed along this edge 270 in a spaced relationship are speaker ports 275a–e.

Note also that although in FIG. 2 speaker ports are formed in back housing 220, they may alternately be formed in front housing 210 or in both housings. Note that while according to the present invention, speaker ports 275a–e are in a spaced relationship, no precise or regular spatial relationship is required. The greatest advantage is obtained, however, where the individual speaker ports are spaced sufficiently distant from each other than an average person will not be able to seal an ear over all of them. The benefit of this configuration, of course, could be realized even if the speaker parts in spaced relationship were found on the face 202 of top housing 210, and in an alternate embodiment (not shown) they are so disposed.

FIG. 3 is a perspective-view illustration of assembled hands-free speakerphone 200 in an assembled condition. As can be seen in the illustration, speaker ports 275a–e are distributed in a spaced relationship along curved edge 270.

Enhancing the benefit of the spatially distributed speaker ports is the curved edge 270 created as front housing 210 and back housing 220 are brought together, and along which speaker ports 275a–e are preferably disposed. As shown in FIG. 3, the radius of this curve is preferably large enough to ensure that a typical user's ear cannot be sealed over all of the speaker parts at once. Note, however, that the curved edge 270 need not be semicircular and may assume any curved shape that promotes the anti-sealing effect. As can be seen in FIG. 3, in the assembled hands-free speakerphone 200, keys 213 are operatively positioned in opening 212 so that they may be used to enter a called number or other input. LCD 218 is likewise secured in position so that it may be viewed through window 214.

Figure 4:
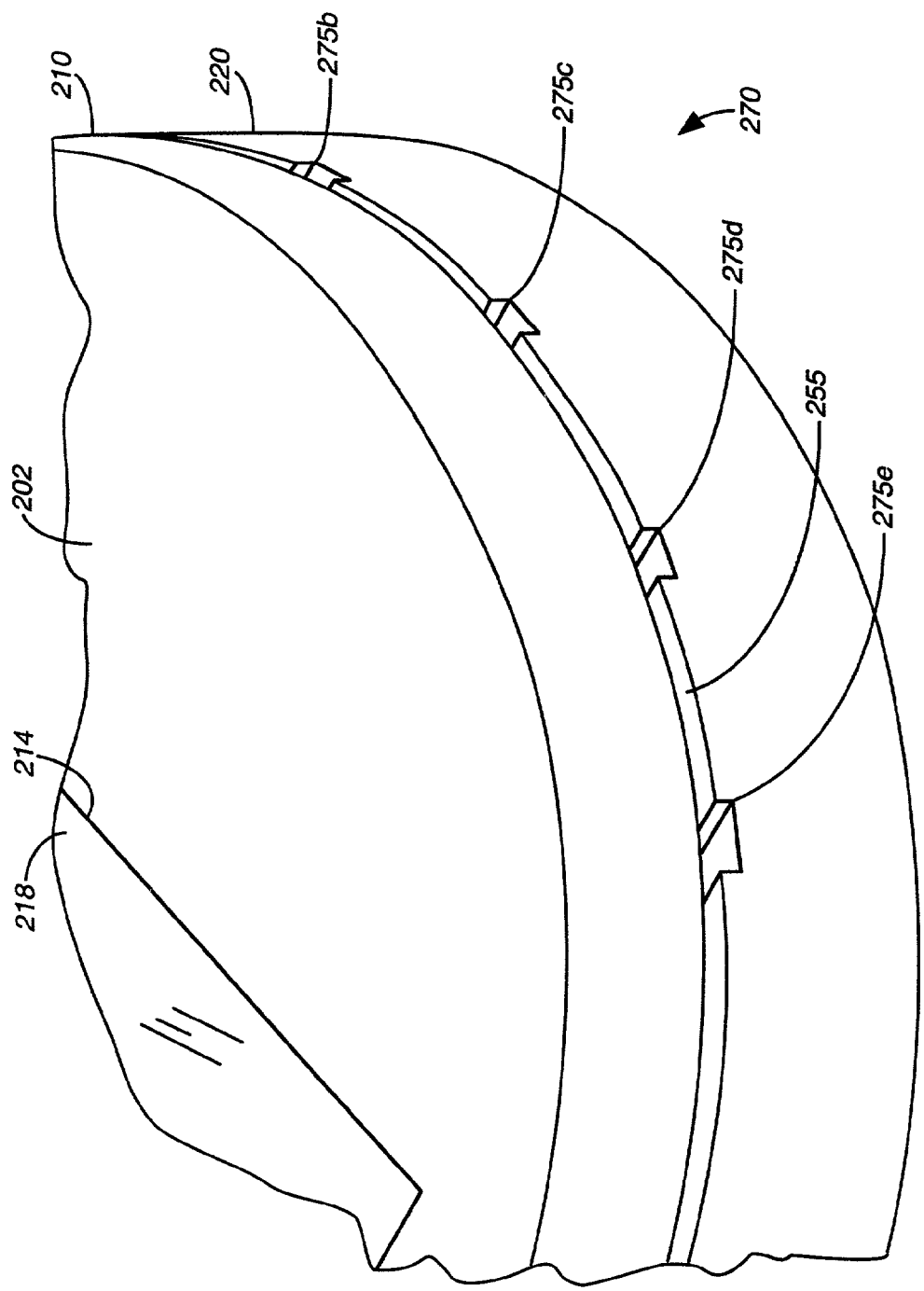
FIG. 4 is a close-up elevation view of the curved edge of the assembled housing of a hands-free speakerphone according to an embodiment of the present invention.

FIG. 4 is an illustration of the housing curved edge 275 of FIG. 3 shown in greater detail. (LCD 218 appearing through window 214 in face 202 of front housing portion 210 is shown for reference.) As can be seen in FIG. 4, the parting line 255 formed in the housing at the juncture of front housing 210 and back housing 220 to some extent hides the speaker ports 275*b–e*. Note that while in FIG. 3 the parting line 255 extends substantially around the housing, this is not a requirement of the present invention. The advantage of the configuration of FIGS. 3 and 4 being both its anti-sealing effect and the fact that the location of speaker ports 275*b–e* will not be readily apparent to the user. Thus makes it difficult if not impossible for a user to inadvertently seal an ear against the speaker ports, especially given their spaced relationship. Note that as used herein, the term "hidden" means only that the feature or features referred to, here specifically the speaker ports 275*b–e*, are not readily apparent to the user. This can be accomplished simply by positioning the features in an unexpected location, but may also include placing them such that they will not be seen at all, at least upon casual inspection. Note that, on the other hand, as used herein the term "hidden" does not imply that the features be undetectable, or even difficult to find. In many cases, however, it is preferable to ensure that the speaker ports at least cannot be easily found by a user attempting to answer a ringing speakerphone.

Figure 6:
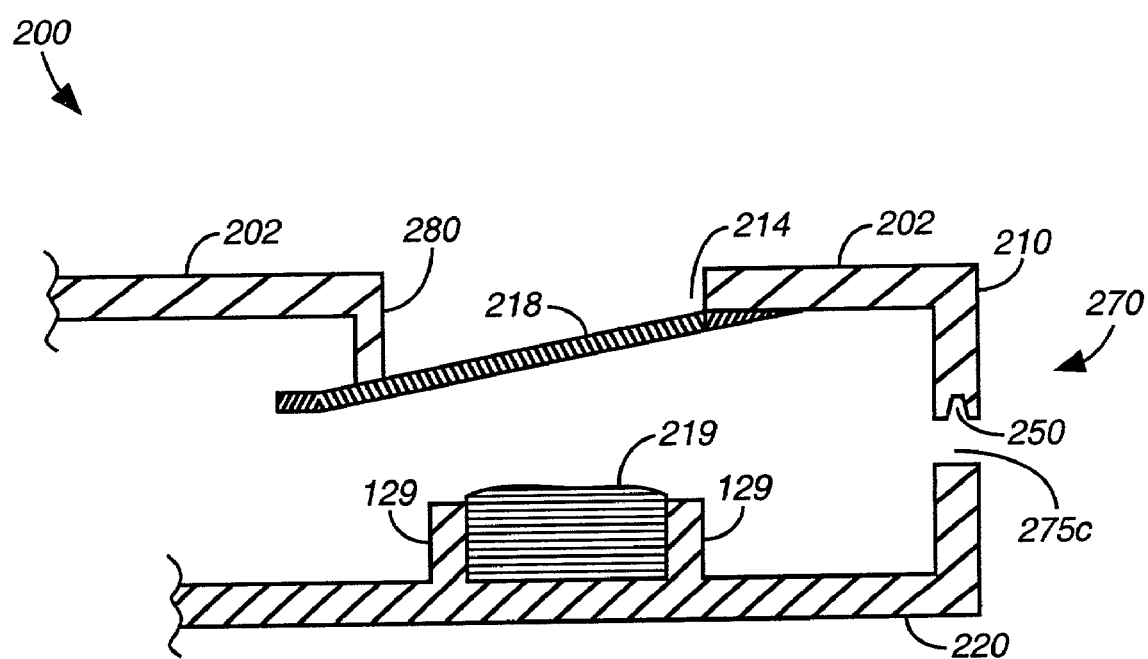
FIG. 6 is a perspective, cross-sectional view of a telephone assembled according to an embodiment of the present invention, taken along line B—B of FIG. 3.

FIG. 6 is a sectional view of telephone 200 taken along section line B—B shown in FIG. 3. As mentioned previously, LCD 218 is secured in place by lateral extension 280 and sloped extension 282. In this embodiment, LCD 218 is disposed above speaker element 219, which itself is positioned inside speaker reservoir 229. Note that this configuration is exemplary and not limiting.

The preferred descriptions are of preferred examples for implementing the invention, and the scope of the invention should not necessarily be limited by this description. The scope of the present invention is defined by the following claims.

What is claimed is:

1. An improved hands-free speakerphone for use with a communications system, said speakerphone comprising:
   a speaker element; and
   a housing for enclosing the speaker element, the housing comprising:
      a front face having a user interface and a peripheral edge, wherein the front face does not form any speaker ports;
      a back face; and
      a peripheral face extending between the front face and the back face along at least a substantial portion of the peripheral edge of the front face;
   wherein the housing forms an elongated recess on the peripheral face, the elongated recess being in communication with at least one speaker port, the elongated recess being of sufficient length and width so as to reduce the risk of a seal forming between the housing and a user's ear.

2. The hands-free speakerphone of claim 1, wherein the peripheral face possesses sufficient curvature at the location of the at least one speaker port so as to further reduce the risk that the outer surface portion including the at least one speaker port can be sealed against the ear of a user.

3. The hands-free speakerphone of claim 1, wherein the housing comprises a front portion that includes the front face and a back portion that includes the back face adjoin along a parting line in a fixed relationship when the hands-free speakerphone is assembled for use, wherein the elongated recess is formed along the parting line.

4. The hands-free speakerphone of claim 3, wherein the at least one speaker port is formed on an inner surface of the elongated recess.

5. The hands-free speakerphone of claim 1, further comprising a plurality of speaker ports formed in the elongated recess in a spaced relationship relative to each other.

6. The hands-free speakerphone of claim 5, wherein the spaced relationship includes sufficient spatial separation between speaker ports to further reduce the risk that the housing can be sealed against the ear of the user.

7. The hands-free speakerphone of claim 5, wherein the housing comprises a first portion and a second portion and the elongated recess is formed at the juncture of the first housing portion and the second housing portion.

8. An improved hands-free speakerphone for use with a communications system, said speakerphone comprising:
   a speaker element; and
   a housing for enclosing the speaker element, the housing comprising;
      a front face having a user interface and a peripheral edge;
      a back face, wherein the front face and the back face do not form any speaker ports; and
      a peripheral face extending between the front face and the back face along at least a substantial portion of the peripheral edge of the front face;
   wherein the housing forms an elongated recess on the peripheral face, the elongated recess being in communication with at least one speaker port, the elongated recess being of sufficient length and width so as to reduce the risk of a seal forming between the housing and a user's ear.

* * * * *